(12) United States Patent
Antin et al.

(10) Patent No.: US 9,208,470 B2
(45) Date of Patent: Dec. 8, 2015

(54) SYSTEM FOR CUSTOM USER-GENERATED ACHIEVEMENT BADGES BASED ON ACTIVITY FEEDS

(75) Inventors: Judd Antin, Berkeley, CA (US); Elizabeth F Churchill, San Francisco, CA (US); David Ayman Shamma, San Francisco, CA (US); Marco de Sa, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 469 days.

(21) Appl. No.: 13/252,799

(22) Filed: Oct. 4, 2011

(65) Prior Publication Data

US 2013/0086484 A1 Apr. 4, 2013

(51) Int. Cl.
```
G06F 3/0481      (2013.01)
G06Q 10/10       (2012.01)
G06Q 30/02       (2012.01)
G06Q 50/00       (2012.01)
```

(52) U.S. Cl.
CPC .............. *G06Q 10/10* (2013.01); *G06Q 30/02* (2013.01); *G06Q 50/01* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,996,402 B2 * | 2/2006 | Logan et al. | ............... | 455/456.1 |
| 7,325,190 B1 * | 1/2008 | Boehmer et al. | ............. | 715/224 |
| 7,487,234 B2 * | 2/2009 | Doss et al. | .................. | 709/223 |
| 8,001,003 B1 * | 8/2011 | Robinson et al. | .......... | 705/14.53 |
| 8,108,255 B1 * | 1/2012 | Robinson et al. | .......... | 705/14.44 |
| 8,342,845 B2 * | 1/2013 | Margiotta | .................... | 434/107 |
| 8,398,490 B1 * | 3/2013 | Phelon et al. | ................... | 463/42 |
| 8,538,786 B2 * | 9/2013 | Linehan | ....................... | 705/7.11 |
| 2003/0046163 A1 * | 3/2003 | Carpenter et al. | ............ | 705/14 |
| 2003/0212595 A1 * | 11/2003 | Antonucci | ...................... | 705/14 |
| 2006/0200463 A1 * | 9/2006 | Dettinger et al. | ................ | 707/6 |
| 2006/0206378 A1 * | 9/2006 | Ficalora | .......................... | 705/14 |
| 2007/0260641 A1 * | 11/2007 | Bohannon et al. | ........... | 707/200 |
| 2009/0158186 A1 * | 6/2009 | Bonev et al. | .................. | 715/769 |
| 2009/0198666 A1 * | 8/2009 | Winston et al. | .................... | 707/5 |
| 2009/0299847 A1 * | 12/2009 | Keeter et al. | .............. | 705/14.35 |
| 2010/0199297 A1 * | 8/2010 | Cesmedziev | .................... | 725/24 |
| 2011/0015981 A1 * | 1/2011 | Subramanian | ............. | 705/14.23 |
| 2011/0307399 A1 * | 12/2011 | Holmes | ........................ | 705/319 |
| 2012/0084124 A1 * | 4/2012 | Reis | ............................ | 705/14.4 |
| 2012/0150695 A1 * | 6/2012 | Fan et al. | ..................... | 705/27.1 |
| 2013/0006682 A1 * | 1/2013 | Huff et al. | .................... | 705/7.11 |

OTHER PUBLICATIONS http://support.twitter.com/groups/31-twitter-basics (4 pages).
http://en.wikipedia.org/wiki/Twitter (26 pages).
http://www.flickr.com/tour/ (1 page).
http://e.wikipedia.org/wiki/Foursquare_(website) (9 pages).

(Continued)

*Primary Examiner* — Phenuel Salomon
(74) *Attorney, Agent, or Firm* — Weaver Austin Villeneuve & Sampson LLP

(57) ABSTRACT

Disclosed are methods and apparatus for generating and awarding user-generated badges. In one embodiment, a user-generated badge may be generated in response to input received via a graphical user interface. The user-generated badge may be represented by a media token and have associated therewith a set of rules defining one or more activities to be completed. Activity data may be monitored via one or more data sources based upon the set of rules. An instance of the user-generated badge may be automatically awarded to individuals satisfying the set of rules.

25 Claims, 8 Drawing Sheets

(56) References Cited

OTHER PUBLICATIONS http://en.wikipedia.org/wiki/Wikipedia:Barnstars (37 pages).
http://stackoverflow.com/badges (3 pages).
http://personalweb.about.com/od/makefriendsonfacebook/qt/facebookvampire.htm (1 page).
http://news.cnet.com/8301-17939_109-9727759_2.html (2 pages).
http://www.bigdoor.com/category/blog/badges/ (7 pages).
http://en.wikipedia.org/wiki/Yahoo!_Answers (10 pages).

* cited by examiner

SYSTEM FOR CUSTOM USER-GENERATED ACHIEVEMENT BADGES BASED ON ACTIVITY FEEDS

BACKGROUND OF THE INVENTION

The disclosed embodiments relate generally to methods and apparatus for generating, managing, and awarding custom user-generated badges.

Virtual goods or gifts have a long history in social media. For example, virtual gifts may include virtual cards and achievement badges. However, virtual gifts are one dimensional—although users can exchange them, they do not embody or encourage social interactions and experiences. Current badge systems are exclusively top-down—designers create badges which users can choose to earn by completing the required activities. Produced for the masses by designers and marketers who have no connection to users, these badges are one-dimensional, lack context, and fail to embody the social interactions that are implicit, even when users give each other simple virtual gifts. As such, today's virtual badging systems fail to engage and motivate users.

SUMMARY OF THE INVENTION

The disclosed embodiments enable users to generate custom badges. These custom badges may be generated based upon user input for application in a wide variety of contexts. Once generated, the custom badges may be awarded to individuals who satisfy the criteria established for earning the custom badges.

In accordance with one embodiment, a user-generated badge may be generated in response to input received via a graphical user interface. The user-generated badge may be represented by a media token and have associated therewith a set of rules defining one or more activities to be completed. Activity data may be monitored via one or more data sources based upon the set of rules. An instance of the user-generated badge may be automatically awarded to individuals satisfying the set of rules.

In accordance with another embodiment, at least one graphical user interface supporting generation of a custom badge may be provided. The custom badge may be represented by a media token and have associated therewith a set of rules. The set of rules may be generated according to a rule generation template in response to first input received via the at least one graphical user interface. In addition, the system may identify the media token that has been received or selected via the at least one graphical user interface in response to second input. The system may create and store a badge having the set of rules and represented by the media token, wherein an instance of the badge represented by the media token is automatically awarded to individuals satisfying the set of rules, wherein each of the set of rules identifies one or more actions to be completed.

In accordance with yet another embodiment, a badge generation template may be presented, where the badge generation template includes a plurality of rule options. A selection of one or more of the plurality of rule options may be received. A set of rules may be generated from the selected one or more of the plurality of rule options. The set of rules may be associated with a media token to generate a badge represented by the media token. An instance of the badge represented by the media token may be automatically awarded to individuals satisfying the set of rules, wherein each of the set of rules identifies one or more actions to be completed.

In accordance with yet another embodiment, a plurality of rule options may be presented, where the plurality of rule options include a plurality of activities. A selection of one or more of the plurality of rule options may be received such that one or more of the plurality of activities are selected. A set of rules defined by the selected one or more of the plurality of rule options may be stored such that the set of rules is associated with a media token. An instance of a badge represented by the media token may be automatically awarded to individuals satisfying the set of rules, wherein the set of rules identifies the one or more of the plurality of activities to be completed.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Figure 1:
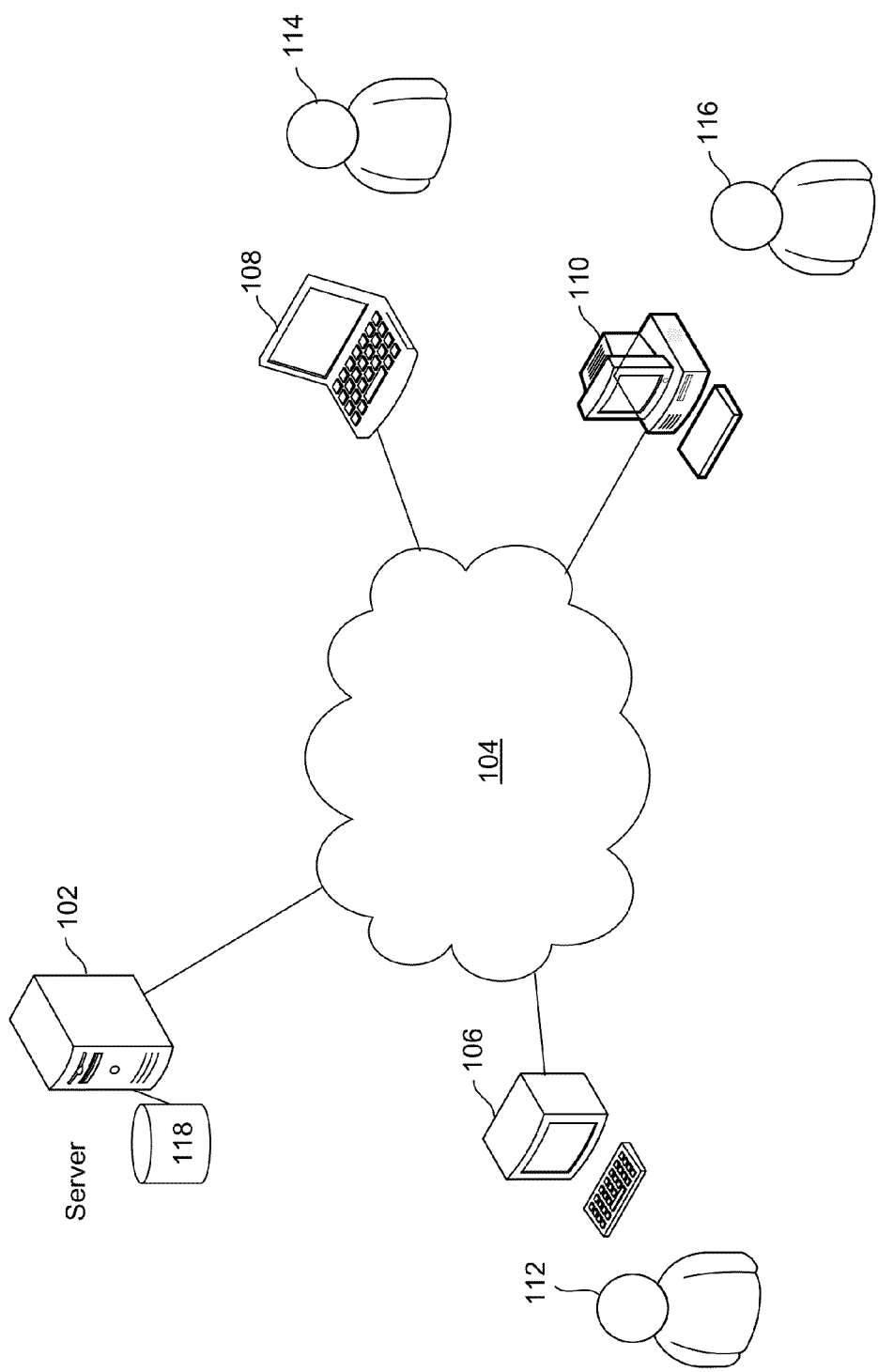
FIG. 1 is a diagram illustrating an example system in which embodiments of the invention may be implemented.

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Recent efforts at motivating users to produce and engage with social media have largely been focused on non-monetary incentives in the form of game mechanics such as badges. Badges add an activity component to traditional virtual gifts. Popularized by sites such as FourSquare, Yelp, and Badgeville, badges are typically awarded to users who engage in a specific set of actions.

Despite the popularity of badging systems in social media, current badging implementations do not capitalize on the unique motivational and engaging qualities of badges. Existing badging systems focus on top-down models in which system designers and their marketing partners create badges which users can then earn. However, exclusively top-down systems fail to engage and motivate users.

In accordance with various embodiments, users can create their own custom digital achievement badges. User-generated badges may be made publicly available, or may be shared with a smaller group of specific individuals. For example, a user that has generated a badge may make the badge available to their social contacts within a particular social network. In addition, the user-generated badges may be created for specific contexts. Example contexts will be described in further detail below.

In accordance with various embodiments, a user may generate a custom achievement badge that may be earned when a corresponding set of rules has been satisfied. Since a badge may be earned by more than one individual, the awarding of a badge may be referred to as awarding an "instance" of the badge. For example, the set of rules may establish behavioral criteria, where an instance of the badge is awarded when the behavioral criteria have been met. The system may automatically track and record users' online activities and apply conditional logic to automatically award badges once the users' behavioral criteria have been met. The disclosed embodiments may be applied in a wide variety of contexts, which may include: (1) businesses (e.g., retailers) that create custom badges that may be earned by customers, (2) individual users who create custom badges that may be earned by their friends (e.g., based upon shared activities), and (3) company (and partner) created and branded badges which are part of larger public relations campaigns.

FIG. 1 is a diagram illustrating an example system in which embodiments of the invention may be implemented. As shown in FIG. 1, the system may include one or more servers 102 associated with a web site such as a social networking web site. Examples of social networking web sites include Yahoo, Facebook, Tumblr, LinkedIn, Flickr, and Meme. The server(s) 102 may enable the web site to provide a variety of services to its users. More particularly, users of the web site may generate custom achievement badges via a badgemaking application, as will be described in further detail below. The users may then make the custom achievement badge available to a set of users who may then earn an instance of the custom achievement badge upon satisfying a corresponding set of rules, which may define behavioral criteria for awarding the badge.

In this example, the server(s) 102 may obtain or otherwise receive data (e.g., account data and/or user profile) and/or requests (e.g., search requests or custom badge requests) via the Internet 104 from one or more computers 106, 108, 110 in association with corresponding entities 112, 114, 116, respectively. For example, each of the entities 112, 114, 116 may be an individual, a group of individuals (e.g., group, business or company), or other entity such as a web site. However, in order to simplify the description, the disclosed embodiments will be described with reference to individuals that are users of the web site.

The server(s) 102 may enable the users 112, 114, 116 to submit search queries via a search engine, generate/modify a profile that defines or represents features of that user, and/or update account data for the user. The account data may include information pertaining to the user's previous purchases, as well as other personal information such as residence address, gender, age, etc. Therefore, the account data may be automatically updated to include information pertaining to the user's purchases. A user's profile may be available to the general public, to those that are members of the web site, and/or to a specific category of those members of the web site. A search request may be a search for a document, web site, web page, an individual, etc.

A badge that has been generated by a user may be made available by the user to the public, or to a particular set of individuals (e.g., friends or customers). For example, a name of the badge, a media token representing or associated with the badge, and criteria for earning an instance of the badge may be made available via the user's profile. Although an image is commonly used to represent a badge, the media token may include a digital instantiation of one or more of a variety of types of media including, but not limited to, a digital image (e.g., photo, custom graphics), video, and/or audio clip (e.g., ringtone or other audio segment). As a result, the user's account data may be updated to include information pertaining to custom badge(s) generated by the user. In addition, the account data may be automatically updated to include information pertaining to badges that have been earned by the user.

The server(s) 102 may store data pertaining to each of the individuals that have earned an instance of a badge. For example, the system may maintain data on a per-badge basis for each badge that identifies each of a set of individuals that have earned an instance of the badge. As another example, the system may maintain data for each individual that identifies each of a set of badges that the individual has been awarded. The system may provide data regarding one or more individuals that have been awarded a particular badge via a graphical user interface, which may be made available to the user that generated the particular badge. Data obtained, generated, received, and/or maintained by the server(s) 102 may be stored to one or more databases 118.

The disclosed embodiments enable custom achievement badges to be generated by users, as will be described in further detail below. More particularly, a badgemaking application may be accessed via the web site, or via an application that has been downloaded to a device such as a mobile device. Where a badge is generated via a mobile application, information pertaining to the badge (e.g., name, media token, and associated behavioral criteria) may be transmitted to the server(s) for storing in association with the user's account data. In addition, the server(s) 102 may automatically collect online behavioral data for any of users 112, 114, 116, and automatically award instances of badges upon satisfaction of corresponding behavioral criteria based upon the behavioral data that has been collected. Notification of the awarding of an instance of a badge (and corresponding media token) to a user may be accomplished via a variety of mechanisms. Similarly, the media token associated with a badge may also be made available to a user via a variety of mechanisms. Examples of these mechanisms will be described in further detail below.

In accordance with various embodiments, an individual may enroll to earn a particular badge. More particularly, the individual may specify a set of one or more badges that the individual is interested in earning. The system may thereafter monitor behavioral data associated with the individual. Alternatively, the system may automatically ascertain badges that are available to various individuals, and monitor behavioral data associated with each of the individuals that is registered with the corresponding system web site.

In accordance with various embodiments, the server(s) 102 allow users to perform various tasks in addition to the creation of badges. More particularly, users may manage badges they have created, search and browse available badges such as those generated by their friends, search and browse badges that have been earned by their friends, and/or track their progress towards earning badges. In addition, users may customize their profile to enable or prevent various users to view their custom generated badges and/or earned badges, as well as specify a desired method of notification when they have earned a badge.

Behavioral criteria for earning a custom badge may be defined in the form of one or more activities. An activity may be an online activity or "real world" activity (e.g., event). Therefore, users generating custom achievement badges may specify activity-based criteria for earning custom badges. Regardless of whether an activity is an online activity or "real world" activity, the system may determine whether an activity has been completed based upon behavioral data such as activity data that is collected online and/or input received from a user (e.g., badge creator). In accordance with various embodiments, once an individual has signed up to earn a badge, the system may automatically track their online activity (and/or any user input received), apply the custom activity-based criteria for that badge, and send a notification to the individual indicating that the badge has been awarded once the requisite activities have been completed.

In accordance with various embodiments, the system may enable a user such as the badge creator to provide input indicating that an individual has completed one or more criterion for earning a badge. For example, it may be difficult to determine whether a particular individual completed an activity such as attending a party. Therefore, the badge creator may submit input to the system indicating that this criterion has been satisfied by the individual.

Figure 2A:
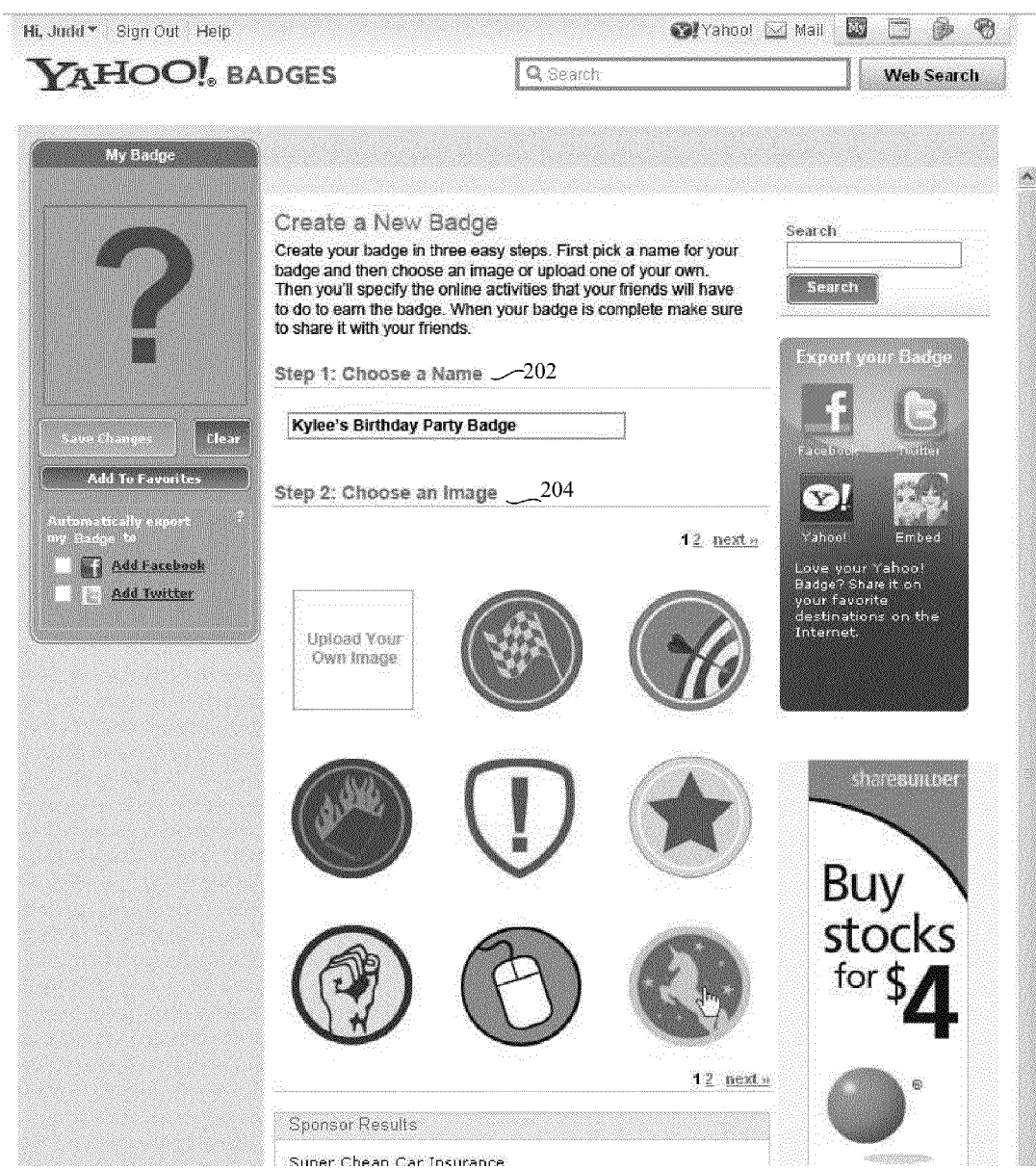
FIGS. 2A-B are screen shots illustrating example graphical user interfaces for generating custom user-generated badges in accordance with various embodiments.
Figure 2B:
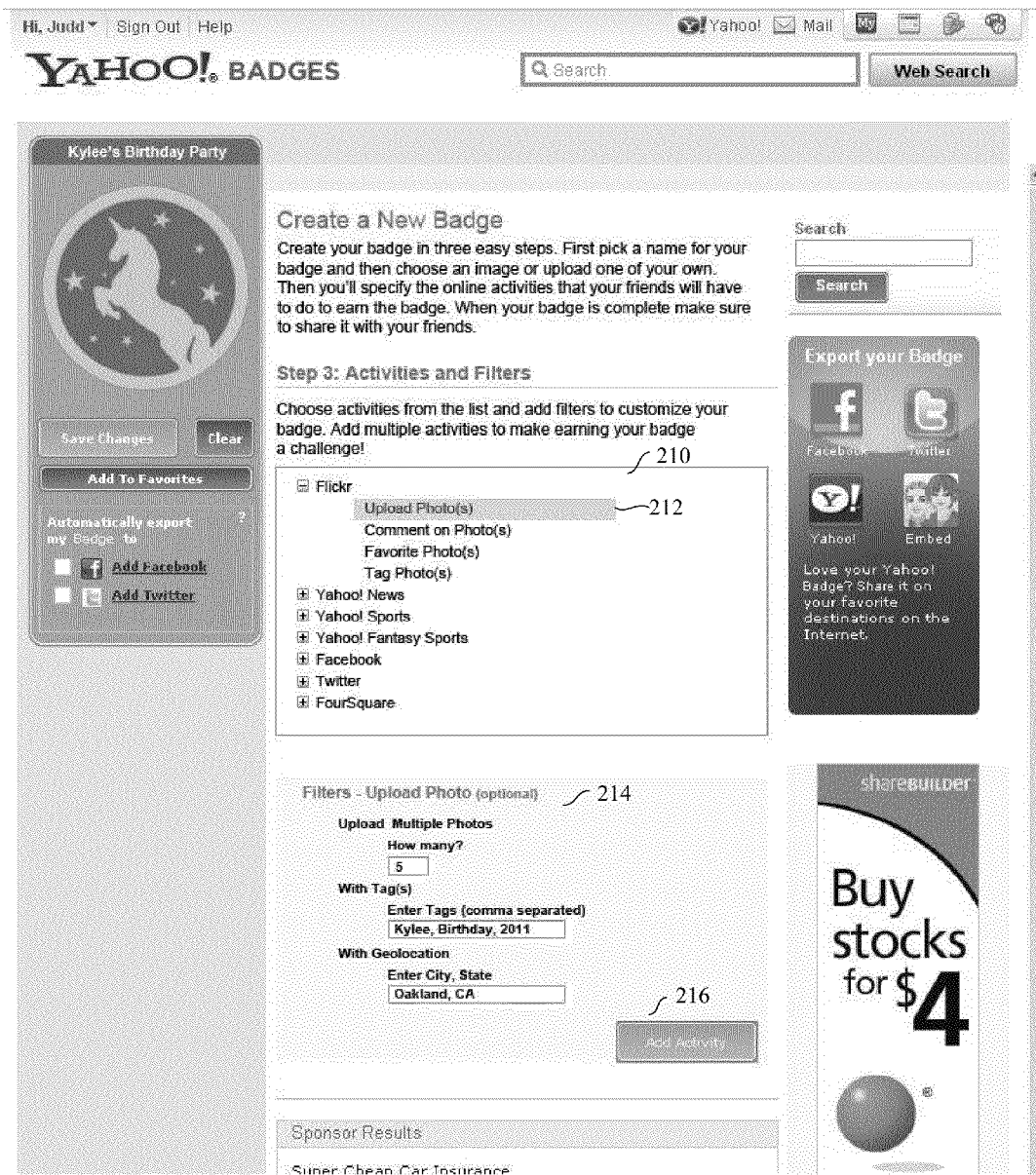

FIGS. 2A-B are screen shots that illustrate example graphical user interfaces for generating a custom achievement badge. In this example, Jenn is throwing a large birthday bash for her 7 year-old daughter Kylee and all her friends. In order to provide a memento of the event and also encourage parents to upload photos from the party, Jenn uses Yahoo! Badging to create the "Kylee's Birthday Party" badge and share it with the parents of Kylee's friends. In accordance with various embodiments, a custom achievement badge may be generated according to a badge generation template. For example, as shown in FIG. 2A, a user may enter a name for their custom badge at 202. In addition, the user may select a digital media token from a plurality of media tokens at 204. Alternatively, the user may choose to upload a media token, which may be received and stored by the system in response to input from the user. In this example, the media token is an image. However, the media token may include a digital instantiation of a variety of types of media, including an image (e.g., photo, custom graphics), video, and/or audio clip.

Through a simple user interface, one or more pre-defined templates for user activities may be accessed by a user (e.g. "Do X online activity Y times in Z location") to create one or more custom badge criteria, as will be described in further detail below. As shown in FIG. 2B, a user may generate a custom achievement badge by using one or more visual interfaces to generate user-defined activity-based criteria (e.g., rules) for earning an instance of the badge. More particularly, the system may present a plurality of rule options from which a user may select one or more rule options. Once the system has obtained a selection of one or more of the plurality of rule options that have been presented, a set of rules may be generated based upon the selected rule option(s). For example, the plurality of rule options may include a plurality of inputs (e.g., data sources), where activity data may be collected via each of the plurality of inputs that is selected. In this manner, a user may select one or more data sources via which one or more user-specified activities is to be monitored. As another example, the plurality of rule options may include a plurality of filters (e.g., activities), where each of the plurality of filters may filter the activity data that is collected via at least one of the plurality of inputs. In other words, each activity may be defined through the use of one or more filters.

As shown in this example, the user may select one or more inputs from a plurality of inputs 210 in order to request that activity data be collected via the selected input(s). The input(s) for activity data may include internal and/or external source(s), which may enable real-time or near real-time activity data to be collected via one or more Application Programming Interfaces (APIs) and/or data sources. More particularly, the activity data may be collected from internal and/or external data sources in the form of one or more authenticated data feeds. This may be accomplished through authentication of individuals with the external data sources, enabling the web site to link individual accounts to the external data sources. More particularly, individuals may link their accounts on the web site with the external data sources by entering authenticating information for those external data sources, such as a username and password. Example inputs for obtaining activity data include Flickr, Yahoo!, Yahoo! News, Yahoo! Sports, Yahoo! Fantasy Sports, Facebook, Twitter, and FourSquare. Thus, the activity data may include communications of individuals such as Tweets. By selecting one or more of the plurality of inputs 210, the user may select one or more inputs via which activity data is to be automatically collected. In this manner, the user may select a web site or other social context, enabling the user to specify one or more activities pertaining to the selected web site or social context.

Through the interface, the user may combine the selected input(s) for activity data and one or more filters for filtering the activity data to identify one or more activities that are to be completed in order to earn an instance of the badge. More particularly, the user may select and/or enter information pertaining to one or more filters for each input for activity data. Each of the plurality of inputs may have an associated set of one or more filters that may be selected and/or defined. In accordance with various embodiments, each of the inputs may have associated therewith a different set of one or more filters that are selectable by a user generating a custom achievement badge. More particularly, upon receiving a selection of one of the inputs, a set of one or more filters corresponding to the selected input may be presented for user selection. The system may obtain a selection of one of the set of filters. The system may further prompt the user for additional information pertaining to one or more characteristics of the selected filter. The user may then further specify information associated with the selected filter. Upon receiving information pertaining to one or more characteristics of the selected filter (e.g., activity), the system may generate a set of rules associating the information pertaining to the one or more characteristics with the selected filter (e.g., activity). Accordingly, through the use of one or more filter(s), one or more activities may be defined in association with a particular web site or social context.

For example, as shown in FIG. 2B, the user has selected the input "Flickr," which has an associated set of filters "Upload Photo(s)," "Comment on Photo(s)," "Favorite Photo(s)," and "Tag Photo(s)." In this example, each of the set of filters identifies a different one of a set of activities that may be monitored in association with the selected input. Upon selecting one of the plurality of inputs, the associated set of filters may be presented for selection by the user. The user in this example has selected the filter "Upload Photo(s)" 212. The system may then prompt the user for further input pertaining to the selected filter, as shown at 214. More particularly, the system may prompt the user for information pertaining to one or more characteristics of the selected filter. In this example, the user is prompted for a number of photos to be uploaded, one or more tags that should be associated with the uploaded photo(s), and a geographical location identified in association with the uploaded photos. As shown in this example, the user indicates that five photos are to be uploaded, where each of the photos should include one or more of the entered tags, and where each of the photos should be uploaded from the identified geographical location. In this manner, the user may specify one or more characteristics of an activity such as the number of times it is to be completed, tag(s) associated with digital content pertaining to the activity, and/or geographical location in which the activity is completed. The user may save the activity by clicking on the "Save Activity" icon 216. Accordingly, an activity may be defined by a corresponding filter, where the filter specifies one or more characteristics of the activity Once a custom badge has been generated, a user may share the badge with a group of individuals (e.g., friends of the user within a social network, customers, etc.). This may be accomplished, for example, by posting a badge profile on their user profile that is visible via the social network web site. A badge profile may also be made accessible via a separate badge profile page. A badge profile may include information pertaining to the badge and an explanation as to how an individual may earn an instance of the badge. More particularly, the badge profile may include a name of the badge, identify a media token associated with the badge, and/or list one or more activities to be completed to earn the badge. The badge profile may also include additional information pertaining to the badge, such as a number of people who have earned an instance of the badge, a number of people who are in the process of earning an instance of the badge, and/or track the progress of the individual viewing the badge profile towards earning an instance of the badge. In this manner, a user may share the badge with the group of individuals. Any of these individuals may choose to complete the identified activities to earn the custom badges. The system may use the selected filters to obtain selected information from the activity data received via the selected input(s), and automatically award an instance of the badge to those individuals meeting the activity-based criteria. In this example, when a user has uploaded five photos, where each of the photos includes one or more of the entered tags and is uploaded from Oakland, Calif., the user is awarded an instance of the custom badge.

Figure 3:
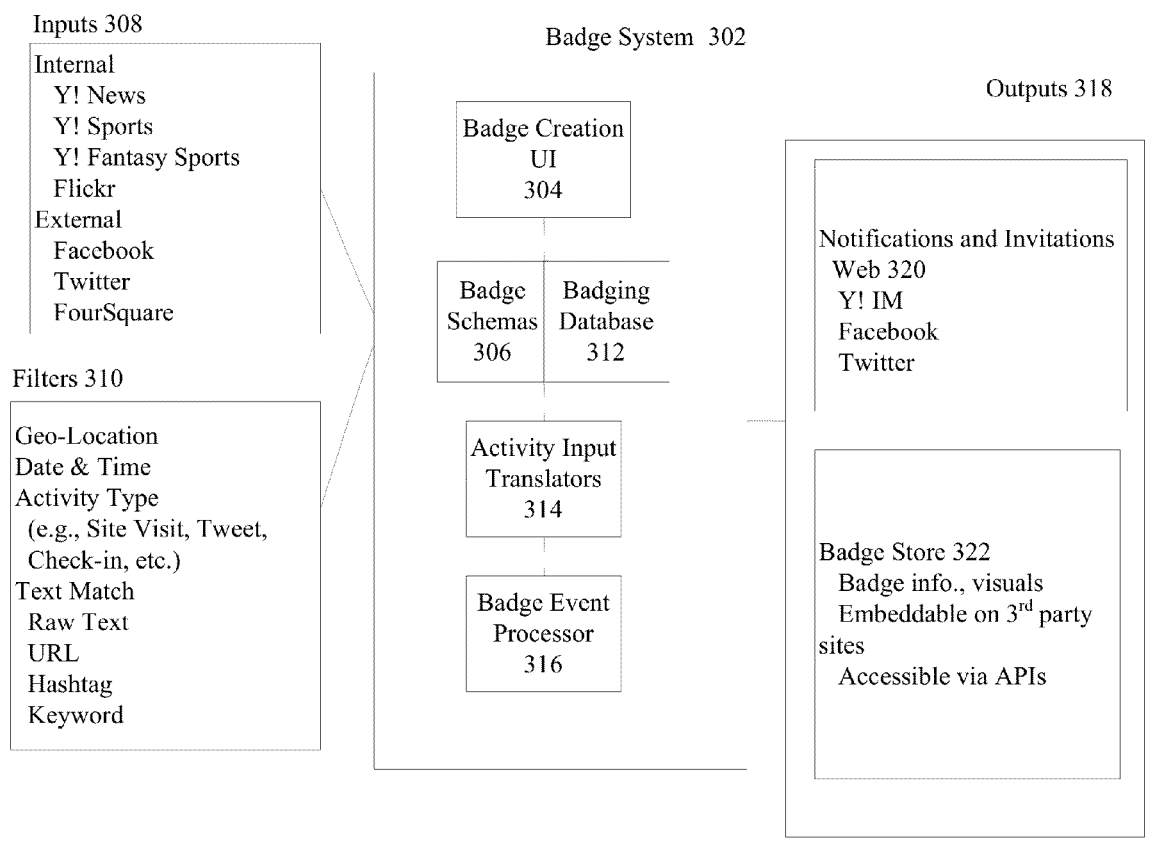
FIG. 3 is a diagram illustrating an example system architecture for generating and awarding custom user-generated badges.

FIG. 3 is a diagram illustrating an example system architecture for generating and awarding custom user-generated badges. A system 302 may support the generation of custom achievement badges through a badge creation user interface (UI) 304. The badge creation UI may be presented in the form of one or more separate graphical user interfaces, as described above with reference to FIGS. 2A-B. More particularly, the system 302 may present the badge creation UI 304 through the use of one or more badge templates (e.g., schemas) 306 for obtaining user input for generating a custom badge. Each of the badge templates may serve as a visual guide for obtaining user input. A badge template may be static. Alternatively, a badge template may be dynamic to enable different user options to be presented to a user in response to user input. In this example, templates may be implemented for receiving user input pertaining to inputs 308 via which activity data is to be collected, as well as selecting and/or defining filters 310 for identifying characteristics of each activity to be completed in order to award an instance of the custom badge.

As shown in FIG. 3, the inputs 308 may include one or more internal inputs and/or one or more external inputs. An internal input may be a data source that is maintained by the web site, while an external input may be a data source that is not maintained by the web site. Example internal inputs that are internal to Yahoo! include Y! News, Y! Sports, Y! Fantasy Sports, and Flicker. Example external inputs that are external to Yahoo! include web sites such as Facebook, Twitter, and FourSquare. Access to external input web sites may be achieved via one or more APIs offered via the external web sites.

Each of the filters 310 may include user-specified criteria for defining a particular activity. Various types of filters 310 may include a geographical location, a date and/or time of day, an activity type, and/or a text match. Examples of activity types include a site visit, a Tweet, a check-in, an upload, a review, a comment, and forwarding. A text match may be used in a variety of contexts to match a specific set of text, a uniform resource locator (URL), a hashtag, and/or a keyword. For example, by specifying a particular hashtag, the hashtag may thereafter be detected in communications. The term "hashtag" may be used to refer to a tag embedded in a message posted on the Twitter microblogging service, including a word within the message prefixed by a hash sign (#).

Once the system 302 creates the custom badge based upon the user input, the badge may be stored in a badging database 312. The system 302 may implement one or more activity input translators 314 to obtain activity data in the form of one or more activity data streams obtained from the selected input(s) associated with a particular badge and format the activity data for use by a badge event processor 316. The badge event processor 316 may automatically monitor the activity data to implement the rules associated with the badge to determine, based upon the activity data, whether an instance of the badge is to be awarded. More particularly, the badge event processor 316 may apply the user-specified criteria of a filter to the activity data obtained via the selected input to determine whether an activity has been completed by an individual. The badge event processor 316 may automatically award instances of badges as they are earned by individuals.

In accordance with various embodiments, the badge event processor 316 may also monitor real-time activity data received via a mobile device in order to ascertain whether an individual has completed a particular activity. For example, a global positioning system (GPS), compass, and/or accelerometer may enable location, direction of movement, and/or acceleration of the individual to be monitored.

The system 302 may generate various outputs 318. More particularly, the system may send messages to individuals in the form of notifications and/or invitations 320. In addition, the system may make badges (or corresponding media tokens representing the badges) available to individuals who have been awarded the badges via various mechanisms such as a badge store 322.

The system 302 may send notifications and/or invitations 320 under various circumstances. More particularly, the system may send one or more invitations to a set of one or more individuals indicating that a badge has been created and/or made available to the individuals by the user creating the badge. The invitations may be transmitted in response to user input, or automatically. More particularly, the invitations may be transmitted to the user's contacts, friends, and/or a set of individuals specified by the user. In this manner, the system may provide a conditional offer of a badge to a particular set of individuals. Similarly, the system may send a notification to each of the individuals who has earned an instance of the badge by completing the user-defined set of online activities. Notifications and/or invitations may be transmitted via various mechanisms including, but not limited to, Yahoo! instant messenger, electronic mail, Facebook, and/or Twitter. In this manner, individuals may receive notifications and/or invitations via a network device or mobile device.

The badge store 322 may provide or otherwise make an instance of a badge that has been earned available to the individual that has earned the badge. More particularly, the badge store 322 may store badge information such as the name of a badge, activities completed to earn the badge, and/or one or more media tokens associated with the badge. The badge store 322 may "push" an instance of the badge (or media token(s) representing the badge) to the individual (e.g., via electronic mail, Facebook, etc.) and/or enable the individual to obtain (e.g., download) an instance of the badge (or media token(s) representing the badge). For example, an instance of the badge (or media token) may be automatically provided to the individual's profile page on a web site such as Facebook or Yahoo!. As another example, the user may "unlock" the instance of the badge (or media token) by performing an action such as entering a code, logging in to the web site (or a badger account), or accessing the individual's profile page. In accordance with various embodiments, mobile devices may enable individuals who have earned badges to display them (e.g., media tokens, badge identifiers, or bar codes) in order to receive specials, deals, or coupons from participating businesses (e.g., retailers, wholesalers, or restaurateurs).

In accordance with various embodiments, the badge store 322 may be embedded on a third party site. More particularly, the badge store 322 may be made available via one or more APIs. In this manner, an individual may easily access an instance of a badge or corresponding media token that the individual has earned. In addition, the badge store 322 may enable an individual to access information pertaining to badges that they have not yet earned.

Figure 4:
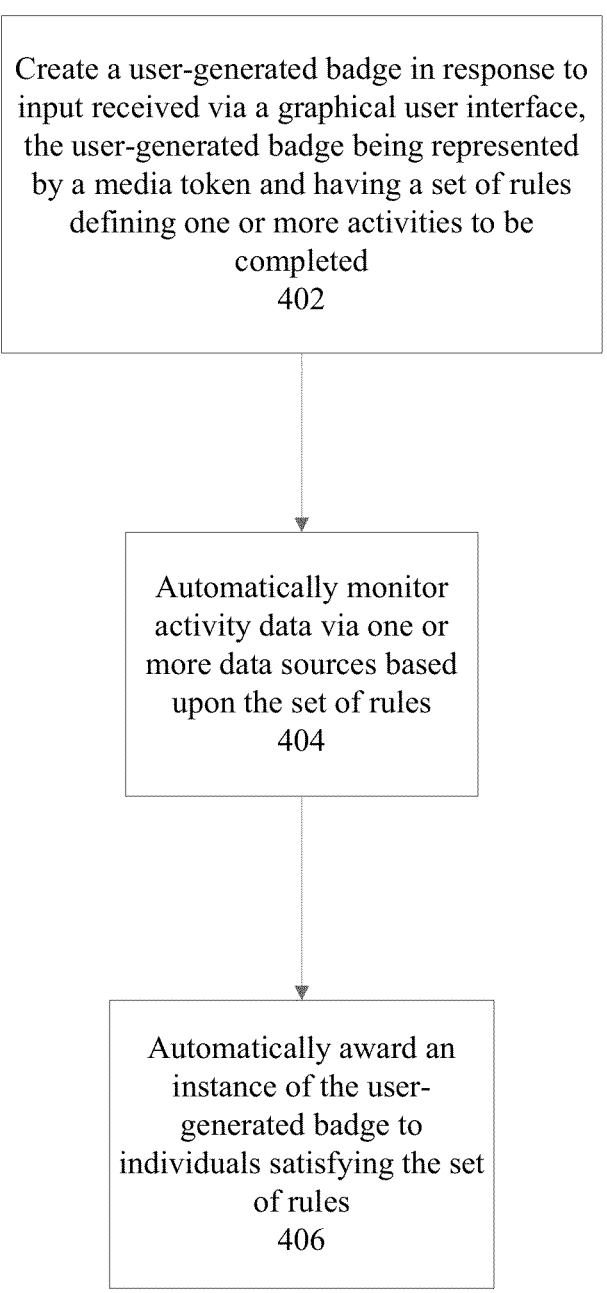
FIG. 4 is a process flow diagram illustrating an example method of implementing custom badges in accordance with various embodiments.

FIG. 4 is a process flow diagram illustrating an example method of implementing custom badges in accordance with various embodiments. The system may generate a user-generated badge in response to input received via a graphical user interface at 402. The user-generated badge may be represented by a media token and have associated therewith a set of rules defining one or more activities to be completed. The system may automatically monitor activity data via one or more data sources based upon the set of rules at 404. The system may automatically award an instance of the user-generated badge to individuals satisfying the set of rules at 406. For example, the system may automatically notify an individual that the individual has been awarded the instance of the badge represented by the media token.

Figure 5:
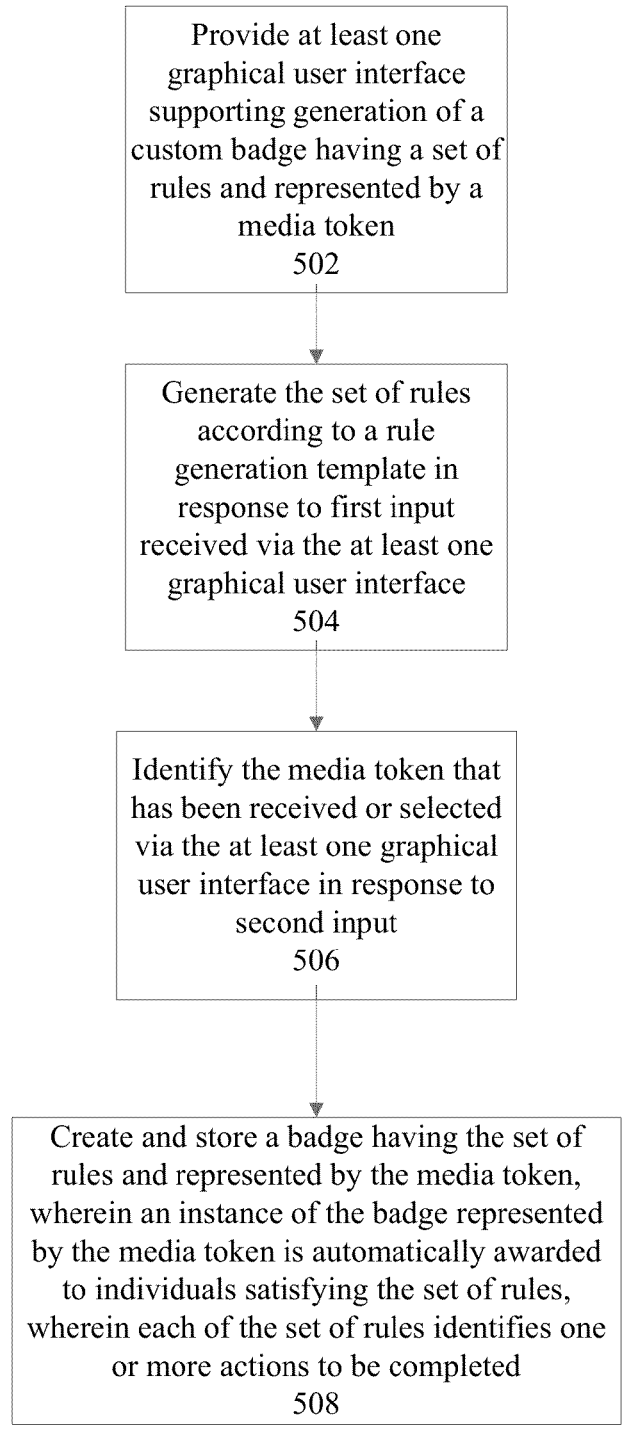
FIG. 5 is a process flow diagram illustrating an example method of creating a custom badge in accordance with various embodiments.

FIG. 5 is a process flow diagram illustrating an example method of creating a custom badge in accordance with various embodiments. The system may provide at least one graphical user interface supporting generation of a custom badge having a set of rules and represented by a media token at 502. More particularly, the system may present a badge generation template supporting the generation of a badge. The badge generation template may include a rule generation template including a plurality of rule options. The system may generate the set of rules at 504 according to a rule generation template in response to first input received via the at least one graphical user interface. More particularly, the system may receive a selection of one or more of the plurality of rule options and generate a set of rules from the selected one or more of the plurality of rule options. In addition, the system may identify the media token that has been received or selected at 506 via the at least one graphical user interface in response to second input. The system may create and store a badge having the set of rules and represented by the media token at 508, wherein an instance of the badge represented by the media token is automatically awarded to individuals satisfying the set of rules, wherein each of the set of rules identifies one or more actions to be completed. More particularly, the system may obtain activity data for a plurality of individuals from one or more data sources. An instance of the badge represented by the media token may be automatically awarded to each of the plurality of individuals satisfying the set of rules based upon the activity data.

Badge Creation for Businesses

In accordance with various embodiments, a custom badge may be generated by a business or organization. More particularly, a user associated with the business or organization may generate a custom badge on behalf of the business or organization. For example, the user may be a merchant such as a wholesaler, retailer, or other business proprietor (e.g., restaurateur), or an individual employed by or operating on behalf of the merchant. Thus, the input (e.g., first input and the second input) may be received from an individual associated with the business or organization. In addition, the set of rules and/or the media token may be tied to the business of the merchant (or other organization). For example, the set of rules may identify activities benefiting or pertaining to the business or organization. Moreover, the media token may represent the business or organization (e.g., by displaying a trademark or graphic representing the business or organization).

Merchants may offer a custom badge to the general public, or a specific set of individuals such as customers or subset thereof. Individuals awarded an instance of the badge may be eligible for benefits pertaining to the business or organization. In this manner, a business or organization may confer benefits pertaining to the business or organization to an individual (e.g., customer) who has completed activities that benefit or pertain to the business or organization.

In accordance with various embodiments, through application of the disclosed embodiments, merchants can attach specials and deals to badges such that they may be awarded only to users who earn the badge. This provides merchants with a unique capability to reliably link deals or coupons to the completion of specific activities. More particularly, the merchant may create a badge with specific online activity criteria, and only once those criteria have been met does the individual gain access to the deal or coupon associated with the badge. Because the system may track detailed activities of individuals, merchants can ensure that individuals take actions like reviewing their establishment or uploading photos of their establishment to Flickr or their Y! Local listing page before awarding a special deal or coupon. In this way, the disclosed embodiments may promote individuals' contributing user-generated content about businesses such as local listings and then reward them for doing so. This unique format may therefore create "coupons with a memory."

The provisioning of deals and coupons may be handled directly through the system. More particularly, individuals who have earned an instance of a badge with an associated deal (or coupon) may be notified when they earn the instance of the badge. For example, individuals may be notified via their preferred method (email, IM, Y! Messenger, Facebook message, etc.). The digital instantiation of the badge may reside in an individual's badge account. Individuals may redeem their deals or coupons through the use of a badge mobile application implemented on a mobile device or by accessing the badging system via the web site. For example, when individuals arrive at the merchant's venue, they may retrieve the badge information (e.g., media token), and interact directly with the merchant.

When merchants tie valuable deals or coupons to badges, mitigating the risk of fraud and controlling the redemption of deals or coupons may be particularly important. In accordance with various embodiments, when an individual earns a badge with an associated deal or coupon, the system may assign a unique identifier to the badge/individual account pair. By possessing the identifier and sharing it with the merchant, the individual can redeem the badge. Once an individual has used the unique identifier, the merchant may choose to remove it from an "active" list, thus preventing the user from re-using or improperly sharing the deal or coupon. The merchant may decide on a badge-by-badge basis whether a badge entitles the earner to repeated discounts or a one-time deal. In addition, if the merchant allows it, the system may enable an individual who has earned a badge to share the associated deal or coupon with a limited number of additional individuals, thus creating a mechanism for marketing and viral sharing.

The system may support the redemption of a deal or coupon at the merchant's business venue and/or online via the merchant's business web site through the use of a variety of mechanisms. In accordance with one embodiment, the unique identifier may take the form of a unique pin or hash key. The individual may access their active pins (or hash keys) associated with earned badges through a badge mobile application, and provide the identifier to the merchant upon arriving to the venue. For example, the individual may physically show the merchant the identifier via the badge mobile application or printed material. The merchant may use a merchant badge application (e.g., via a dedicated dashboard), which may be accessible within the badge web site or the badge mobile application, to find the identifier and redeem it. In accordance with another embodiment, a bar code may be associated with each badge. The individual may physically show the bar code to the merchant via the badge mobile application or printed material. The merchant may scan the bar code via his own mobile phone or using a bar code scanner. Similarly, in accordance with yet another embodiment, two smart mobile phones may each run the badge mobile application, and set up an ad-hoc network to transmit badge information to redeem the associated deal or coupon. In accordance with yet another embodiment, near field communication (NFC) may be used to transmit badge information between two devices. Using a method that does not involve the display of a unique identifier further mitigates the risk of fraud.

The badge web site and/or associated mobile application may provide several key pieces of functionality for merchants. More particularly, through the use of a merchant badge application such as a badge dashboard or via a badge profile, merchants may track statistics related to their badge (s), such as how many individuals have enrolled to earn the badge, how many individuals have earned the badge, how many deals/coupons are outstanding, and/or how many deals/coupons have been redeemed. A number of deals/coupons outstanding may be ascertained based upon the number of badge instances earned, as well as the number of deals/coupons that may be redeemed in association with each of the earned badge instances.

In accordance with various embodiments, merchants may view a summary of different activities that individuals undertook in order to earn the badge. To protect user privacy, however, general activity may be available to merchants in aggregate. In other words, the individuals may not be personally identifiable. Through the use of the disclosed embodiments, merchants may promote user-generated content about their business. Since the badge system tracks user activity in order to award badges, the system may determine specific content related to the business that users created and display the content (or information associated with the users that created the content) for the merchant. Furthermore, the disclosed embodiments may provide merchants with the ability to send future marketing messages and/or future advertising messages to advertise future badges, deals, or coupons to users who have already earned an initial badge. In some embodiments, the user may opt in (or opt out) of receiving future marking and/or advertising messages from the merchant.

It is important to note that although the term "merchant" is used with reference to the generation and redemption of badges, these examples are merely illustrative. Therefore, another individual may also operate on behalf of a merchant or business to perform tasks described as being performed by the merchant. In this manner, the disclosed embodiments may be implemented by businesses to generate, award, and redeem custom user-generated badges.

Various example scenarios in which custom achievement badges may be implemented are described below.

Example Scenarios

Sports Bar: A sports bar may create a badge for customers who check-in at the bar on FourSquare, follow a particular team on Citizensports, and own one of that team's players on a Yahoo! Fantasy Sports team. Customers earning an instance of the badge may receive a discount on happy hour drinks. As those who have already earned the badge continue to check-in at the bar over time, their badge may function as a "loyalty punch card" and badge holders may earn a free beer on their 10th check-in day.

In this example, the system may obtain FourSquare check-in data via an API and authentication data of the customers. Since CitizenSports and Yahoo Fantasy Sports are implemented internal to Yahoo!, Yahoo! may access an activity log associated with each of these internal data sources.

Wedding: The bride and groom may create a badge for friends who check-in at the wedding venue on FourSquare, upload a wedding photo to Flickr, tag the photo with the bride and groom's name, and Tweet about the occasion with a particular wedding hashtag.

In this example, the system may obtain FourSquare check-in data through the use of an API and authentication data of the friends. Since Flickr is implemented internal to Yahoo!, Yahoo! may obtain photo data and tag data from this internal data source. Yahoo! may obtain Twitter data via a Twitter API.

Councilman: A candidate for local office may create a badge for supporters who write 5 comments on local news stories on Yahoo! News and "Like" the candidate on Facebook. Showing the badge on their mobile device may earn supporters entry into a special campaign party.

In this example, Yahoo! may obtain internal Yahoo! News activity data. Yahoo! may obtain a Facebook activity feed through the use of a Facebook API and authentication data (e.g., username and password) for the supporters.

Research Purposes

Learning about Effective Incentive Systems: Today's badging systems are operating on the basis of very little reliable knowledge about how or why achievements can motivate users. Most of these systems focus on the "lowest common denominator" in badges: numerical count-based badges (e.g. posting 5, 10, or 50 comments). The disclosed embodiments may provide behavioral data regarding how to design a badge to motivate users according to a web site's goals. The behavioral data may also provide invaluable information about the power of status, reputation, and/or goal setting to motivate and engage users.

Shared Online Experiences and Digital Goods: The disclosed embodiments may examine how groups of users share online experiences and mark them by exchanging digital content. More particularly, the system may identify the types of experiences that users want to share with their friends, and apply this information to make web site content and services more engaging.

Understanding Usage Patterns: Increasingly users are integrating multiple web services, communication platforms, and social media sites as they search, browse, create content, and interact with others. The disclosed embodiments may be applied to examine and identify usage patterns that span multiple web sites such as Yahoo!, Google, Facebook, and Twitter.

In accordance with the disclosed embodiments, users may generate digital achievement badges that may be earned by other individuals. Through the use of user-created digital achievement badges, users may reward the creation of content and/or social experiences at every scale. More particularly, a user can create personalized experiences for her friends, a small retailer or restaurateur can create a customized reward system for her customers, or a national brand can create a customized incentive program to facilitate distribution of marking information pertaining to the brand. As a result, users may enjoy a more engaging and rewarding use of badges.

Figure 6:
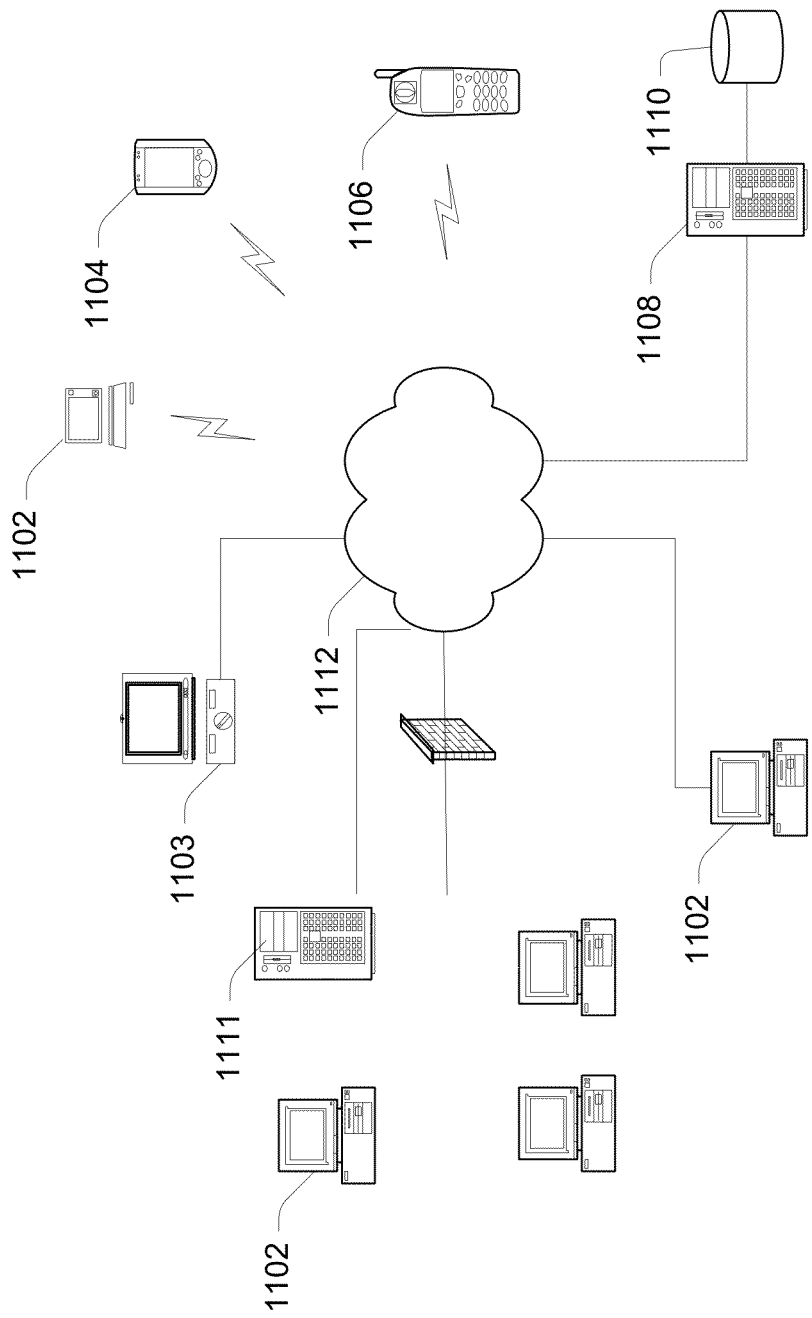
FIG. 6 is a simplified diagram of an example network environment in which various embodiments may be implemented.

The disclosed embodiments may be implemented in any of a wide variety of computing contexts. For example, as illustrated in FIG. 6, implementations are contemplated in which users interact with a diverse network environment via any type of computer (e.g., desktop, laptop, tablet, etc.) 1102, media computing platforms 1103 (e.g., cable and satellite set top boxes and digital video recorders), handheld computing devices (e.g., PDAs) 1104, cell phones 1106, or any other type of computing or communication platform.

And according to various embodiments, input that is processed in accordance with the invention may be obtained using a wide variety of techniques. For example, input for generating a custom badge may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input for generating a custom badge may be obtained in many other ways.

Custom generated badges may be generated and awarded according to the disclosed embodiments in some centralized manner. This is represented in FIG. 6 by server 1108 and data store 1110 which, as will be understood, may correspond to multiple distributed devices and data stores. The data store 1110 may store user account data and/or preferences, badge schemas, media tokens, and/or badges that have been generated. The invention may also be practiced in a wide variety of network environments (represented by network 1112) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. Moreover, a system implementing various embodiments of the invention may be a portable device, such as a laptop or cell phone. The search apparatus and/or web browser of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, schemas (e.g., templates) to be displayed in association with the disclosed methods, badges that have been generated, media tokens, user account data and/or preferences, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 7:
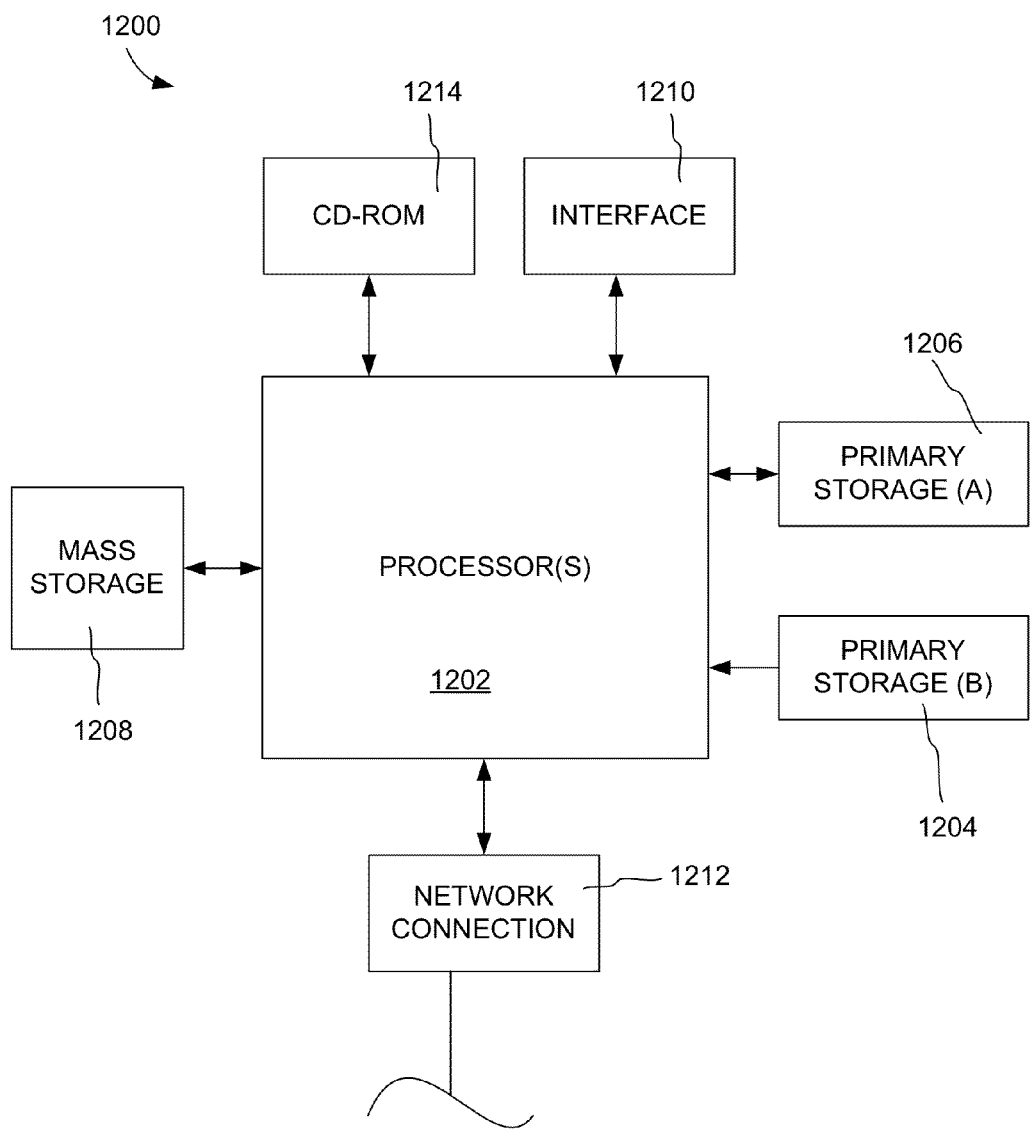
FIG. 7 illustrates an example computer system in which various embodiments may be implemented.

FIG. 7 illustrates a typical computer system that, when appropriately configured or designed, can serve as a system of this invention. The computer system 1200 includes any number of processors 1202 (also referred to as central processing units, or CPUs) that are coupled to storage devices including primary storage 1206 (typically a random access memory, or RAM), primary storage 1204 (typically a read only memory, or ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
   providing at least one graphical user interface supporting generation of a custom badge having a set of rules and represented by a media token, wherein the media token includes a digital image, digital video, or digital audio, the graphical user interface including a plurality of rule options;
   receiving a selection of one or more of the plurality of rule options;
   generating by a processor a set of rules based, at least in part, on the selected one or more of the plurality of rule options received via the at least one graphical user interface;
   identifying a media token that has been received or selected via the at least one graphical user interface;
   storing the set of rules in association with the media token, wherein the set of rules identify one or more actions to be completed to earn an instance of a badge represented by the media token;
   obtaining or monitoring activity data for a particular user;
   determining whether the particular user satisfies the set of rules based, at least in part, on the activity data; and
   awarding an instance of the badge to the particular user according to a result of determining whether the particular user satisfies the set of rules.

2. The method as recited in claim 1, wherein the selection is received from an individual associated with a particular business.

3. The method as recited in claim 2, wherein the set of rules pertain to the particular business.

4. The method as recited in claim 1, wherein the activity data pertains to communications transmitted by the particular user.

5. The method as recited in claim 1, further comprising:
   storing data pertaining to each one of a set of individuals that have earned an instance of the badge.

6. The method as recited in claim 5, further comprising:
   presenting data pertaining to at least one of the set of individuals that have earned an instance of the badge.

7. The method as recited in claim 1, wherein the one or more actions include one or more of the following: uploads, reviews, comments, check-ins, or Tweets.

8. The method as recited in claim 1, wherein the one or more actions pertain to one or more web sites or social contexts, wherein the web sites or social contexts are selected from a plurality of web sites or social contexts.

9. The method as recited in claim 1, wherein the plurality of rule options include a plurality of activity characteristics.

10. The method as recited in claim 1, further comprising:
    awarding an instance of the badge to the particular user satisfying the set of rules such that the media token is provided or otherwise made available to the individual.

11. A computer-readable medium storing thereon computer-readable instructions, comprising:
    instructions for presenting a plurality of rule options, the plurality of rule options including a plurality of activities, the plurality of rule options being user-selectable;
    instructions for obtaining a selection of one or more of the plurality of rule options such that one or more of the plurality of activities is selected;
    instructions for generating a set of rules defined, at least in part, by the selected one or more of the plurality of rule options, wherein the set of rules identifies the one or more of the plurality of activities;
    instructions for storing the set of rules such that the set of rules is associated with a media token, wherein the media token includes a digital image, digital video, or digital audio;
    instructions for determining whether a particular user satisfies the set of rules based, at least in part, on activity data associated with the user; and
    instructions for awarding an instance of a badge represented by the media token to the particular user according to a result of determining whether the particular user satisfies the set of rules.

12. The computer-readable medium as recited in claim 11, wherein the plurality of rule options include a plurality of sources, the computer-readable medium further comprising:
    instructions for presenting the plurality of sources; and
    instructions for obtaining a selection of one of the plurality of sources via which one of the plurality of activities is to be monitored.

13. The computer-readable medium as recited in claim 12, wherein each of the plurality of sources has associated therewith a set of one or more of the plurality of activities, the computer-readable medium further comprising:
    instructions for presenting a set of one or more of the plurality of activities in response to the selection of the one of the plurality of sources; and
    instructions for obtaining a selection of one of the set of one or more of the plurality of activities.

14. The computer-readable medium as recited in claim 13, further comprising:
    instructions for receiving information pertaining to one or more characteristics of the selected activity in response to the selection of the one of the set of one or more of the plurality of activities;
    wherein the set of one or more rules associate the information pertaining to the one or more characteristics with the selected activity.

15. The computer-readable medium as recited in claim 11, further comprising:
instructions for offering the badge represented by the media token to a particular set of individuals.

16. The computer-readable medium as recited in claim 11, further comprising:
instructions for automatically notifying the particular user satisfying the set of rules that the particular user has been awarded an instance of the badge represented by the media token.

17. A method, comprising:
providing least one graphical user interface including a plurality of rule options;
receiving input including a selection of one or more of the plurality of rule options;
generating by a processor a set of rules based, at least in part, on the selected one or more of the plurality of rule options, the set of rules identifying one or more activities to be completed to earn an instance of a badge,
the badge being represented by a media token, wherein the media token includes a digital image, digital video, or digital audio;
monitoring activity data via one or more data sources based, at least in part, upon the set of rules;
determining whether a particular user satisfies the set of rules based, at least in part, on the activity data; and
awarding an instance of the badge to the particular user according to a result of determining whether the particular user satisfies the set of rules.

18. The method as recited in claim 17, further comprising:
sending an invitation to one or more individuals that indicates that the user-generated badge is available to be awarded to each of the one or more individuals that satisfies the set of rules.

19. The method as recited in claim 17, further comprising:
notifying the particular user satisfying-the set of rules that the particular user has been awarded an instance of the badge represented by the media token.

20. The method as recited in claim 17, wherein individuals awarded an instance of the badge are eligible for benefits pertaining to a particular business.

21. The method as recited in claim 17, wherein the media token comprises a bar code.

22. An apparatus, comprising:
a processor; and
a memory, at least one of the processor or the memory being adapted for:
presenting a badge generation template, the badge generation template including a plurality of rule options, the plurality of rule options being user-selectable;
receiving a selection of one or more of the plurality of rule options via the badge generation template;
generating a set of rules based, at least in part, on the selected one or more of the plurality of rule options;
associating the set of rules with a media token to generate a badge represented by the media token, wherein the set of rules identify one or more actions to be completed to earn an instance of the badge, wherein the media token includes a digital image, digital video, or digital audio;
determining whether a particular user satisfies the set of rules based, at least in part, on activity data for the particular user; and
awarding an instance of the badge to the particular user according to a result of determining whether the particular user satisfies the set of rules.

23. The apparatus as recited in claim 22, at least one of the processor or the memory being further adapted for:
providing a graphical user interface for receiving a selection of one of a plurality of media token options.

24. The apparatus as recited in claim 22, at least one of the processor or the memory being further adapted for:
receiving the media token.

25. The apparatus as recited in claim 22, further comprising:
a mechanism supporting redemption of instances of the badge.

* * * * *